(12) United States Patent
Murayama

(10) Patent No.: US 8,967,314 B2
(45) Date of Patent: Mar. 3, 2015

(54) STRADDLE-TYPE VEHICLE

(71) Applicant: Yamaha Hatsudoki Kabushiki Kaisha, Iwata-shi, Shizuoka (JP)

(72) Inventor: Yuki Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/200,096

(22) Filed: Mar. 7, 2014

(65) Prior Publication Data

US 2014/0262571 A1  Sep. 18, 2014

(30) Foreign Application Priority Data

Mar. 15, 2013  (JP) ................................ 2013-054025

(51) Int. Cl.
B60K 15/063 (2006.01)
B62K 11/04 (2006.01)
B60K 13/02 (2006.01)

(52) U.S. Cl.
CPC ................. B62K 11/04 (2013.01); B60K 13/02 (2013.01); B60K 15/063 (2013.01)
USPC .......................... 180/69.4; 180/68.3; 180/292

(58) Field of Classification Search
USPC ....................... 180/68.3, 69.4, 292
See application file for complete search history.

(56) References Cited

U.S. PATENT DOCUMENTS

| 5,205,244 | A | * | 4/1993 | Nakamura et al. | 123/58.1 |
| 5,301,767 | A | * | 4/1994 | Shiohara | 180/219 |
| 5,577,570 | A | * | 11/1996 | Shiohara et al. | 180/219 |
| 5,860,405 | A | * | 1/1999 | Muramatsu et al. | 477/111 |
| 6,142,123 | A | * | 11/2000 | Galasso et al. | 123/486 |
| 7,681,678 | B2 | * | 3/2010 | Shiraishi | 180/68.3 |
| 7,766,119 | B2 | * | 8/2010 | Yokoi et al. | 180/311 |
| 8,157,041 | B2 | * | 4/2012 | Kawai et al. | 180/68.3 |
| 8,181,729 | B2 | * | 5/2012 | Hiramatsu et al. | 180/68.3 |
| 2010/0314188 | A1 | * | 12/2010 | Goto | 180/219 |
| 2010/0319666 | A1 | * | 12/2010 | Usukura et al. | 123/631 |
| 2012/0061159 | A1 | * | 3/2012 | Katsuno et al. | 180/68.3 |
| 2014/0123942 | A1 | * | 5/2014 | Tanaka | 123/403 |
| 2014/0262571 | A1 | * | 9/2014 | Murayama | 180/68.3 |
| 2014/0262572 | A1 | * | 9/2014 | Ide et al. | 180/68.3 |

FOREIGN PATENT DOCUMENTS

| JP | 2003-120360 A | 4/2003 |
| JP | 3466072 B2 | 11/2003 |
| JP | 2006-123656 A | 5/2006 |
| JP | 2010-167796 A | 8/2010 |
| JP | 2012-056441 A | 3/2012 |

* cited by examiner

*Primary Examiner* — Jeffrey J Restifo
(74) *Attorney, Agent, or Firm* — Keating & Bennett, LLP

(57) ABSTRACT

A straddle-type vehicle has reduced wiring and a mass of the vehicle as measured in top-to-bottom and front-to-rear directions with respect to the vehicle is concentrated while minimizing the effects of heat from the engine on an engine control unit and ignition coil. An air cleaner is located rearward of a head pipe. A fuel tank is located rearward of the air cleaner. A rear portion of the air cleaner is located above the engine. A front portion of the fuel tank is located above the engine. The engine control unit and the ignition coil are located above the engine and located between the air cleaner and the fuel tank. The ignition coil overlaps the engine control unit as viewed in a side view of the vehicle.

9 Claims, 16 Drawing Sheets

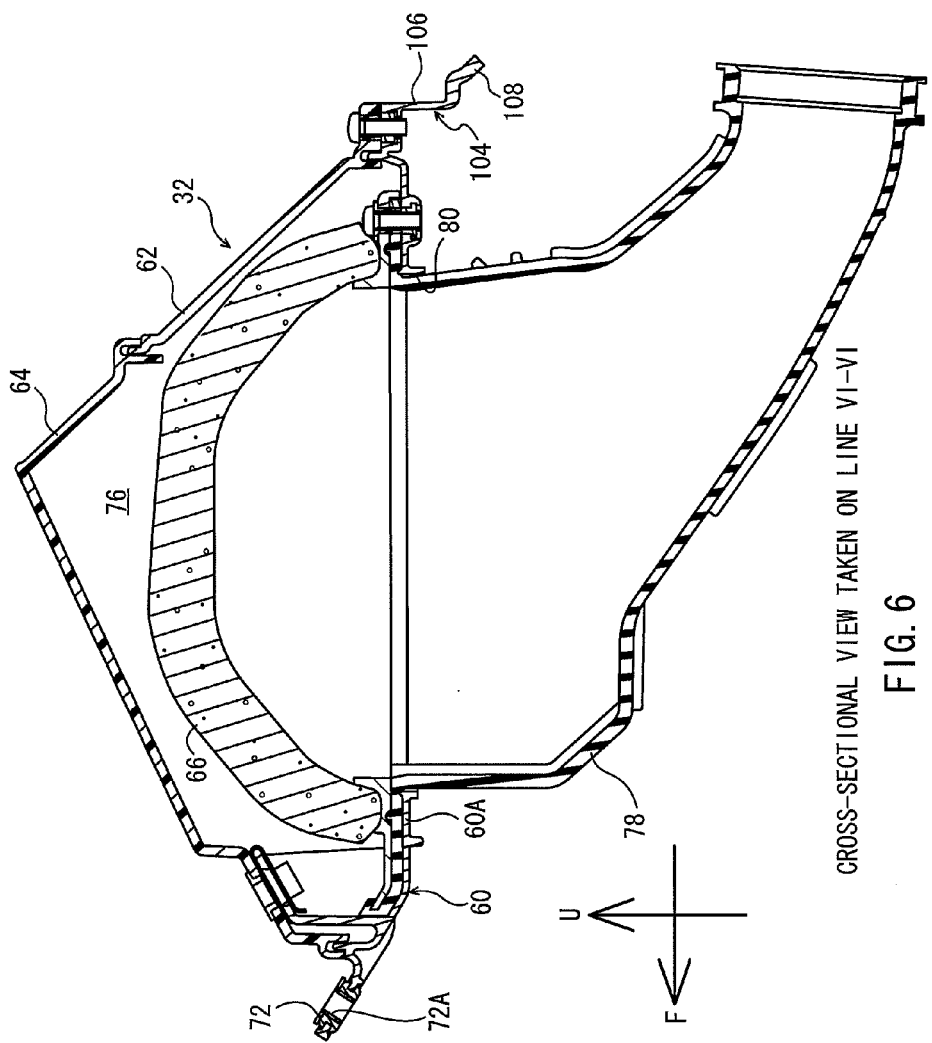
FIG. 6 CROSS-SECTIONAL VIEW TAKEN ON LINE VI-VI

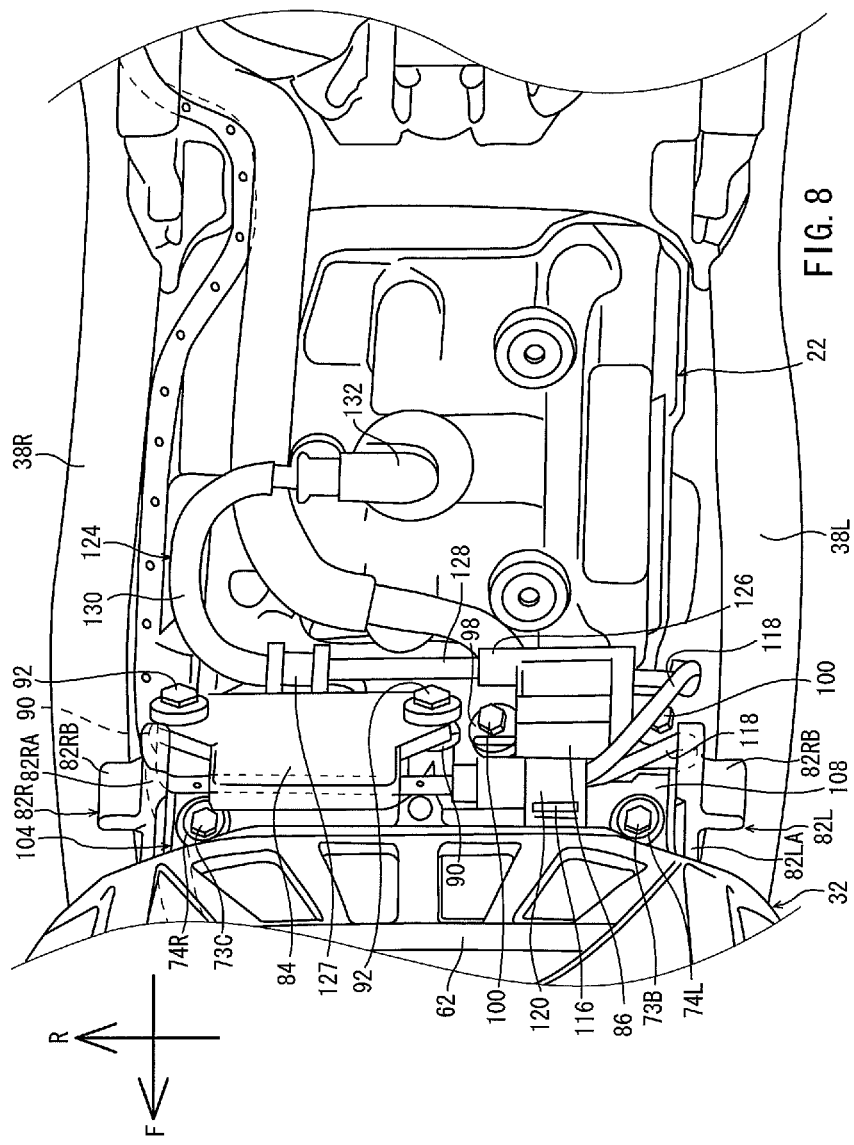

STRADDLE-TYPE VEHICLE

BACKGROUND OF THE INVENTION

1. Field of the Invention

The present invention relates to straddle-type vehicles, and more particularly, to the location of the engine control unit and ignition coil.

2. Description of the Related Art

Straddle-type vehicles include motorcycles, for example. Motorcycles are disclosed in JP 2012-56441 A and JP 2010-167796 A, for example.

According to JP 2012-56441 A, a motorcycle includes a body frame. The body frame includes a head pipe, main frame, center frame, down frame and lower frame. The body frame supports the engine. A fuel tank is located above the engine. The fuel tank is supported by the main frame. A seat is located rearward of the fuel tank. The seat is supported by the seat frame. The seat frame extends rearward from the top end of the center frame. A rear frame is located rearward of the seat frame. An air cleaner is supported by the seat frame and rear frame. The air cleaner is located rearward of the engine. An ECU is located below the seat. The ECU is fixed to the seat frame via a stay. An ignition coil is located forward of the engine. The ignition coil supplies electric power to a spark plug attached to the engine.

According to JP 2010-167796 A, an air cleaner and fuel tank are located above the engine. The air cleaner is located rearward of the head pipe and forward of the fuel tank. Since the air cleaner is located forward of the fuel tank, air can be easily taken in.

According to JP 2012-56441 A, the ECU is located rearward of the engine, and the ignition coil is located forward of the engine. In order to concentrate the mass of the vehicle and reduce the wiring, the ECU and ignition coil are preferably located near the engine.

However, the present inventors discovered that, if the air cleaner and fuel tank are located above the engine, as in JP 2010-167796 A, the mass of the vehicle cannot be concentrated if the ECU and ignition coil are positioned in certain ways.

For example, the ECU and ignition coil may be positioned between the engine and fuel tank as measured in a top-to-bottom direction to reduce the wiring. However, when the effects of heat from the engine on the ECU and ignition coil are considered, the ECU and ignition coil are preferably located distant from the engine. Thus, if the ECU and ignition coil are to be positioned between the engine and fuel tank as measured in a top-to-bottom direction, the fuel tank must be located distant from the engine. This makes it difficult to concentrate the mass of the vehicle as measured in a top-to-bottom direction of the vehicle. In addition, the wiring is increased.

Further, it is desirable to reduce the dimension of a motorcycle as measured in a top-to-bottom direction with respect to of the vehicle. Thus, if the ECU and ignition coil are positioned in the above-discussed manner, the fuel tank must extend rearward to ensure a certain capacity of the fuel tank while concentrating the mass of the vehicle as measured in a top-to-bottom direction with respect to the vehicle. This makes it difficult to concentrate the mass of the vehicle as measured in a front-to-rear direction with respect to the vehicle.

Furthermore, in a motorcycle, not only the fuel tank but also the air cleaner is required to have a certain capacity. Thus, the air cleaner and fuel tank are designed to be as large as possible without getting in the way of other vehicle components. As such, it is not always the case that the ECU and ignition coil can be located together anywhere close to the air cleaner or fuel tank.

Further, the air cleaner and fuel tank are required to have a certain capacity. In a motorcycle, where it is desirable to reduce the dimension as measured in a top-to-bottom direction with respect to the vehicle, the air cleaner and fuel tank must extend rearward if the ECU and ignition coil are to be positioned in the above-discussed manner, to concentrate the mass of the vehicle as measured in a top-to-bottom direction with respect to the vehicle while ensuring a certain capacity. This makes it difficult to concentrate the mass of the vehicle as measured in a front-to-rear direction with respect to the vehicle.

SUMMARY OF THE INVENTION

Preferred embodiments of the present invention provide a straddle-type vehicle in which wiring is reduced and the mass of the vehicle as measured in top-to-bottom and front-to-rear directions with respect to the vehicle is concentrated while minimizing the effects of heat from the engine on the engine control unit and ignition coil.

A straddle-type vehicle according to a first preferred embodiment of the present invention includes a head pipe, a pair of main frames, an engine, an air cleaner, a fuel tank, an engine control unit, and an ignition coil. The pair of main frames extend rearward from the head pipe. The engine is supported by the pair of main frames. The air cleaner is located rearward of the head pipe. The fuel tank is located rearward of the air cleaner. The engine control unit is arranged and programmed to control the operation of the engine. The ignition coil supplies a voltage to a spark plug included in the engine. A rear portion of the air cleaner is located above the engine. A front portion of the fuel tank is located above the engine. The engine control unit and the ignition coil are located above the engine and located between the air cleaner and the fuel tank. The ignition coil overlaps the engine control unit as viewed in a side view of the vehicle.

In the first preferred embodiment of the present invention, a rear portion of the air cleaner is located above the engine. Further, a front portion of the fuel tank is located above the engine. In addition, the engine control unit and ignition coil are located above the engine and located between the air cleaner and fuel tank. This arrangement reduces the wiring that connects the engine control unit and ignition coil with the engine and, at the same time, concentrate the mass of the vehicle.

Since the engine control unit and ignition coil are located between the air cleaner and fuel tank, the engine control unit and ignition coil preferably are positioned distant from the engine even if the air cleaner and fuel tank are located near the engine. As such, the mass of the vehicle is concentrated as measured in a top-to-bottom direction with respect to the vehicle.

If, for example, the engine control unit and ignition coil are located on the lower surface of the air cleaner or fuel tank, the engine control unit and ignition coil are located close to the engine. Thus, to position the engine control unit and ignition coil distant from the engine, the air cleaner or fuel tank, which has the engine control unit and ignition coil provided on the lower surface thereof, must be shifted upward. This makes it difficult to concentrate the mass of the vehicle as measured in a top-to-bottom direction with respect to the vehicle. In contrast, positioning the engine control unit and ignition coil between the air cleaner and fuel tank, as in the first preferred embodiment of the present invention, eliminates the necessity to shift the air cleaner and fuel tank upward. This allows the mass of the vehicle to be concentrated as measured in a top-to-bottom direction with respect to the vehicle.

The ignition coil overlaps the engine control unit as viewed in a side view of the vehicle. The engine control unit and ignition coil are positioned using effectively the space extending in a vehicle width direction. This allows the mass of the vehicle to be concentrated as measured in a front-to-rear direction with respect to the vehicle. Further, arranging the engine control unit and ignition coil so as to overlap each other as viewed in a side view of the vehicle allows the fuel tank to be positioned near the air cleaner. As such, the mass of the vehicle is concentrated as measured in a front-to-rear direction with respect to the vehicle.

The main frame need not extend rearward directly from the head pipe. For example, the main frame may extend rearward from another element connected with the head pipe (for example, a connecting frame connecting the head pipe with the down frame).

A second preferred embodiment of the present invention includes the arrangement according to the first preferred embodiment of the present invention in which the engine control unit and the ignition coil overlap the pair of main frames as viewed in a side view of the vehicle.

In the second preferred embodiment of the present invention, the pair of main frames protect the engine control unit and ignition coil.

A third preferred embodiment of the present invention includes the arrangement of the first or second preferred embodiment of the present invention in which the air cleaner includes a base member. The base member is attached to the pair of main frames. The base member includes attachment portions, a first support, and a second support. The attachment portions each include an insertion hole through which a bolt to attach the base member to the pair of main frames is to be inserted. The first support is located closer to the engine than the attachment portions are, and the engine control unit is attached thereto. A second support is located closer to the engine than the attachment portions are, and the ignition coil is attached thereto.

In the third preferred embodiment of the present invention, intake air pulsations in the air cleaner are less likely to be transmitted to the engine control unit and ignition coil.

A fourth preferred embodiment of the present invention includes the arrangement of any one of the first to third preferred embodiments of the present invention and further includes a connecting cord and wiring. The connecting cord connects the ignition coil with the spark plug. The wiring extends from the engine control unit. The wiring is arranged non-parallel to the connecting cord.

In the fourth preferred embodiment of the present invention, electric signals flowing through the wiring are less likely to contain noise.

A fifth preferred embodiment of the present invention includes the arrangement of the fourth preferred embodiment of the present invention in which the wiring extends downward from the engine control unit. The ignition coil includes a cord support. The cord support is located rearward of the engine control unit as viewed in a plan view of the vehicle. The connecting cord extends from the cord support toward the one of the sides of the vehicle disposed in a vehicle width direction that is adjacent the engine control unit, and passes behind the wiring.

In the fifth preferred embodiment of the present invention, the connecting cord is preferably positioned close to the fuel tank. As such, the mass of the vehicle is concentrated.

A sixth preferred embodiment of the present invention includes the arrangement of the fourth or fifth preferred embodiment of the present invention in which the connecting cord includes an extending portion, a curved portion and a plug cap. The extending portion is connected with the ignition coil and extends from the ignition coil toward the one of the sides of the vehicle disposed in a vehicle width direction that is adjacent the engine control unit. The curved portion is connected with the extending portion and curves as viewed in a plan view of the vehicle. The plug cap is connected with the curved portion and attached to the spark plug.

In the sixth preferred embodiment of the present invention, a certain length of the connecting cord is ensured. As such, the plug cap is easily detached and attached.

A seventh preferred embodiment of the present invention includes the arrangement of any one of the first to sixth preferred embodiments of the present invention in which the lowermost point of the fuel tank is located lower than the lowermost point of the air cleaner. In the seventh preferred embodiment of the present invention, the fuel tank preferably is positioned lower. This allows the mass of the vehicle to be concentrated as measured in a height direction with respect to the vehicle.

An eighth preferred embodiment of the present invention includes the arrangement of one of the first to seventh preferred embodiments of the present invention in which the engine includes a cylinder. The foremost point of the fuel tank is located forward of the rearmost point of the cylinder.

In the eight preferred embodiment of the present invention, the fuel tank may be positioned more forward. This will allow the mass of the vehicle to be concentrated as measured in a front-to-rear direction with respect to the vehicle.

A ninth preferred embodiment of the present invention includes the arrangement of any one of the first to eighth preferred embodiments of the present invention in which the engine control unit and the ignition coil are located higher than the lowermost point of the fuel tank.

In the ninth preferred embodiment of the present invention, the mass of the vehicle is concentrated as measured in a top-to-bottom direction with respect to the vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a cross-sectional view taken on line VI-VI of FIG. 4.

FIG. 8 is a plan view of the ignition coil and engine control unit attached to the air cleaner.

DETAILED DESCRIPTION OF THE PREFERRED EMBODIMENTS

Now, a straddle-type vehicle according to preferred embodiments of the present invention will be described with reference to the drawings. In the description of the present preferred embodiments, the straddle-type vehicle preferably is a motocrosser-type motorcycle, for example. The same or corresponding elements in various drawings are labeled with the same characters and their description will not be repeated.

Figure 1:
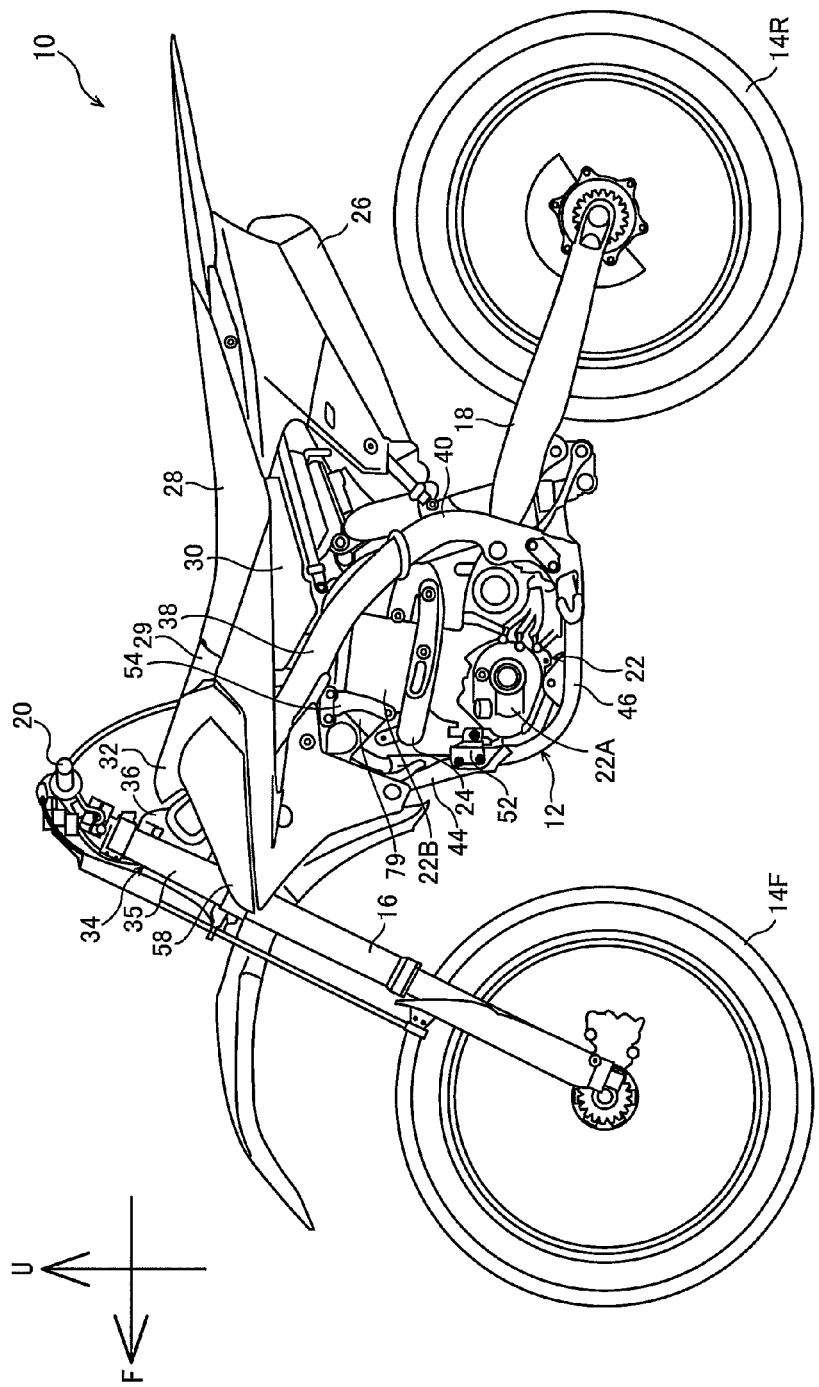
FIG. 1 is a left side view of a motorcycle according to a preferred embodiment of the present invention.

FIG. 1 is a left side view of a motorcycle 10 according to a preferred embodiment of the present invention. In the following description, front/forward, rear/rearward, left and right indicate directions as perceived by a rider sitting on the seat 28 of the motorcycle 10. In FIG. 1, arrow F indicates the forward direction with respect to the motorcycle 10, and arrow U the upward direction with respect to the motorcycle 10.

The motorcycle 10 includes a body frame 12, a front wheel 14F, a rear wheel 14R, a front suspension 16, a rear arm 18, handlebars 20, an engine 22, an exhaust pipe 24, a muffler 26, a seat 28, a fuel tank 30, and an air cleaner 32.

Figure 2A:
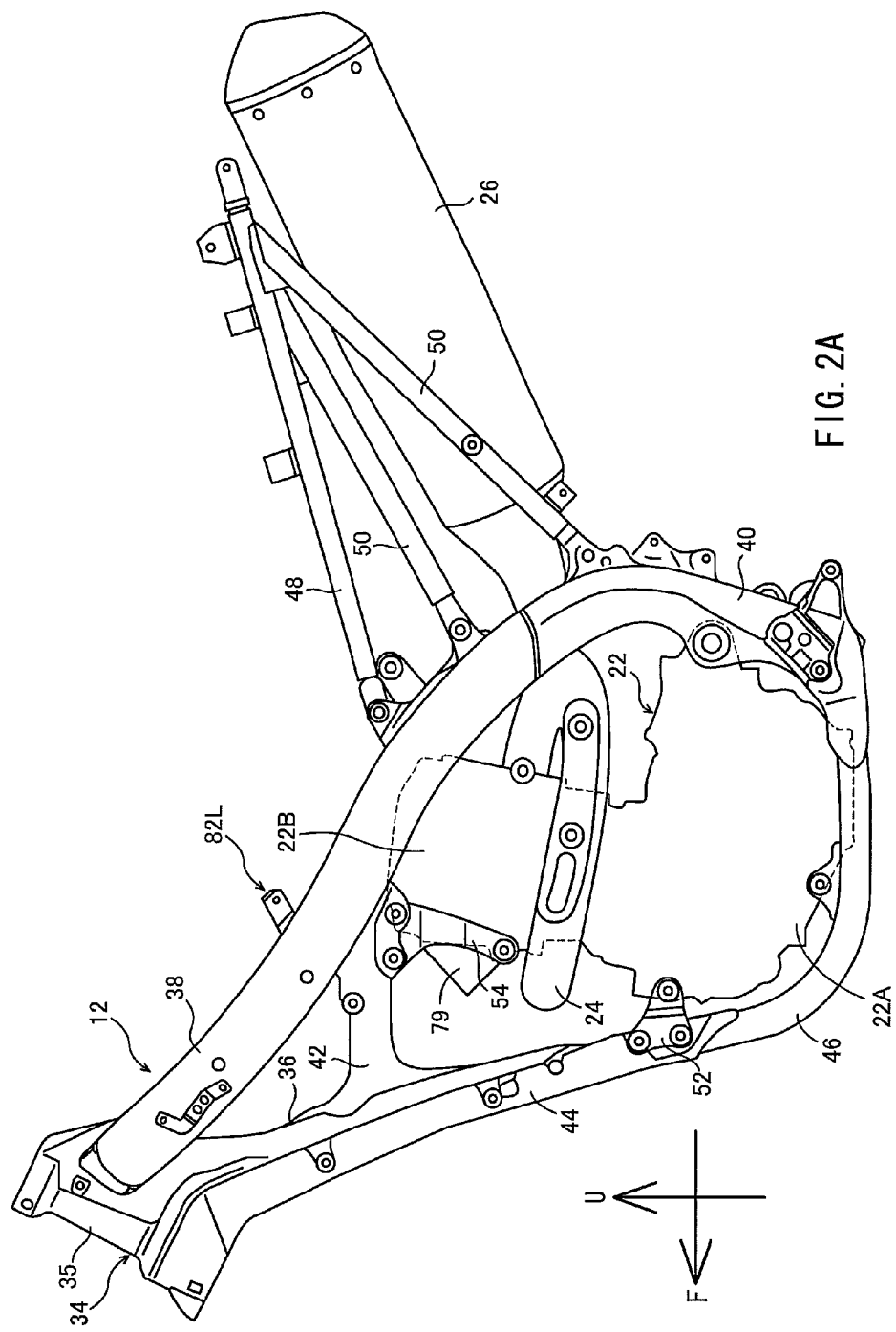
FIG. 2A is a left side view of the body frame.
Figure 2B:
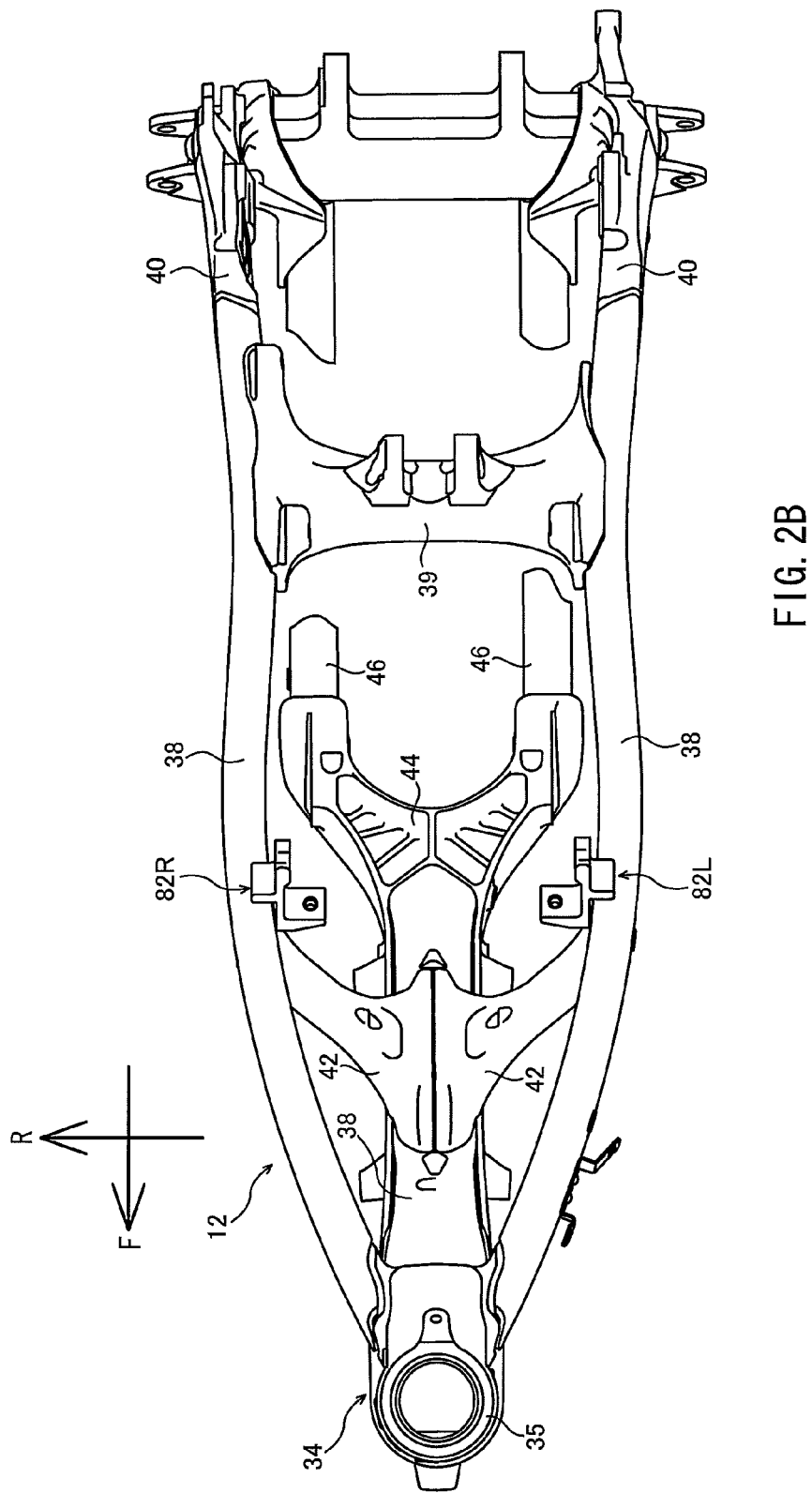
FIG. 2B is a plan view of the body frame.

The body frame 12 will be described with reference to FIGS. 2A and 2B. FIG. 2A is a left side view of the body frame 12. FIG. 2B is a plan view of the body frame. In FIG. 2A, arrow F indicates the forward direction with respect to the motorcycle 10, and arrow U the upward direction with respect to the motorcycle 10. In FIG. 2B, arrow F indicates the forward direction with respect to the motorcycle 10, and arrow L the left direction with respect to the motorcycle 10.

The body frame 12 includes a head pipe 34, a pair of main frames 38, to the left and right, a pair of pivot frames 40, to the left and right, a pair of support frames 42, to the left and right, a down frame 44, a pair of lower frames 46, to the left and right, a pair of seat frames 48, to the left and right, and a pair of back stays 50, to the left and right.

The head pipe 34 is located on the front end of the body frame 12. The head pipe 34 includes a head pipe body 35 and a connecting frame 36. A steering shaft, not shown, is inserted through the head pipe body 35. The connecting frame 36 extends from the head pipe body 35 rearward and downward.

The main frames 38 are connected with the connecting frame 36. The main frames 38 are spaced apart from each other in a vehicle width direction. The main frames 38 extend from the connecting frame 36 rearward and downward. That is, the main frames 38 extend rearward from the head pipe 34.

As shown in FIG. 2B, a cross member 39 is located between the main frames 38. The cross member 39 couples the main frames 38 with each other.

The down frame 44 is connected with the bottom end of the head pipe body 35. The down frame 44 extends rearward and downward from the bottom end of the head pipe body 35. The down frame 44 is connected with the connecting frame 36. That is, the connecting frame 36 couples the head pipe 34 with the down frame 44.

The lower frames 46 are connected with the down frame 44. The lower frames 46 are spaced apart from each other in a vehicle width direction. The lower frames 46 extend rearward and downward from the down frame 44.

The pivot frames 40 are spaced apart from each other in a vehicle width direction. The left pivot frame 40 couples the left main frame 38 with the left lower frame 46. The right pivot frame 40 couples the right main frame 38 with the right lower frame 46.

The support frames 42 are spaced apart from each other in a vehicle width direction. The left support frame 42 couples the connecting frame 36 with the left main frame 38. The right support frame 42 couples the connecting frame 36 with the right main frame 38.

The seat frames 48 are spaced apart from each other in a vehicle width direction. The left seat frame 48 is connected with the cross member 39 and extends from the cross member 39 rearward and upward. The right seat frame 48 is connected with the cross member 39 and extends from the cross member 39 rearward and upward.

The back stays 50 are spaced apart from each other in a vehicle width direction. The left back stay 50 couples the left seat frame 48 with the left pivot frame 40. The right back stay 50 couples the right seat frame 48 with the cross member 39.

Returning to FIG. 1, the front wheel 14F is rotatably supported by the front suspension 16. The front wheel 14F rotates to the left and right as the handlebars 20 are operated. Meters (not shown) are located near the handlebars 20.

The rear wheel 14R is rotatably supported by the rear arm 18 attached to the pivot frames 40. The rear wheel 14R rotates as power from the engine 22 is transferred thereto.

The engine 22 is supported by the body frame 12. More specifically, as shown in FIGS. 1 and 2, the engine 22 is attached to the body frame 12 by a plurality of brackets 52 and 54. More specifically, the crankcase 22A of the engine 22 is attached to the down frame 44 by a pair of brackets 52, to the left and right. The cylinder 22B of the engine 22 is attached to the support frames 42 by a pair of brackets 54, to the left and right. A lower portion of the crankcase 22A is attached to the lower frames 46, and a rear portion of the crankcase 22A is attached to the pivot frames 40.

As shown in FIG. 1, the exhaust pipe 24 is connected with the engine 22. The exhaust pipe 24 extends from an exhaust port provided on the rear side of the cylinder 22B to surround the cylinder 22B. The muffler 26 is connected with the downstream end of the exhaust pipe 24.

The seat 28 is attached to the seat frames 48. The fuel tank 30 is attached to the main frames 38 and seat frames 48. A seat 29 is located forward of the seat 28. The seat 29 covers the fill opening of the fuel tank 30. The air cleaner 32 is attached to the connecting frame 36 and the main frames 38. A pair of air intake ducts 58, to the left and right, are connected with the air cleaner 32.

Figure 3:
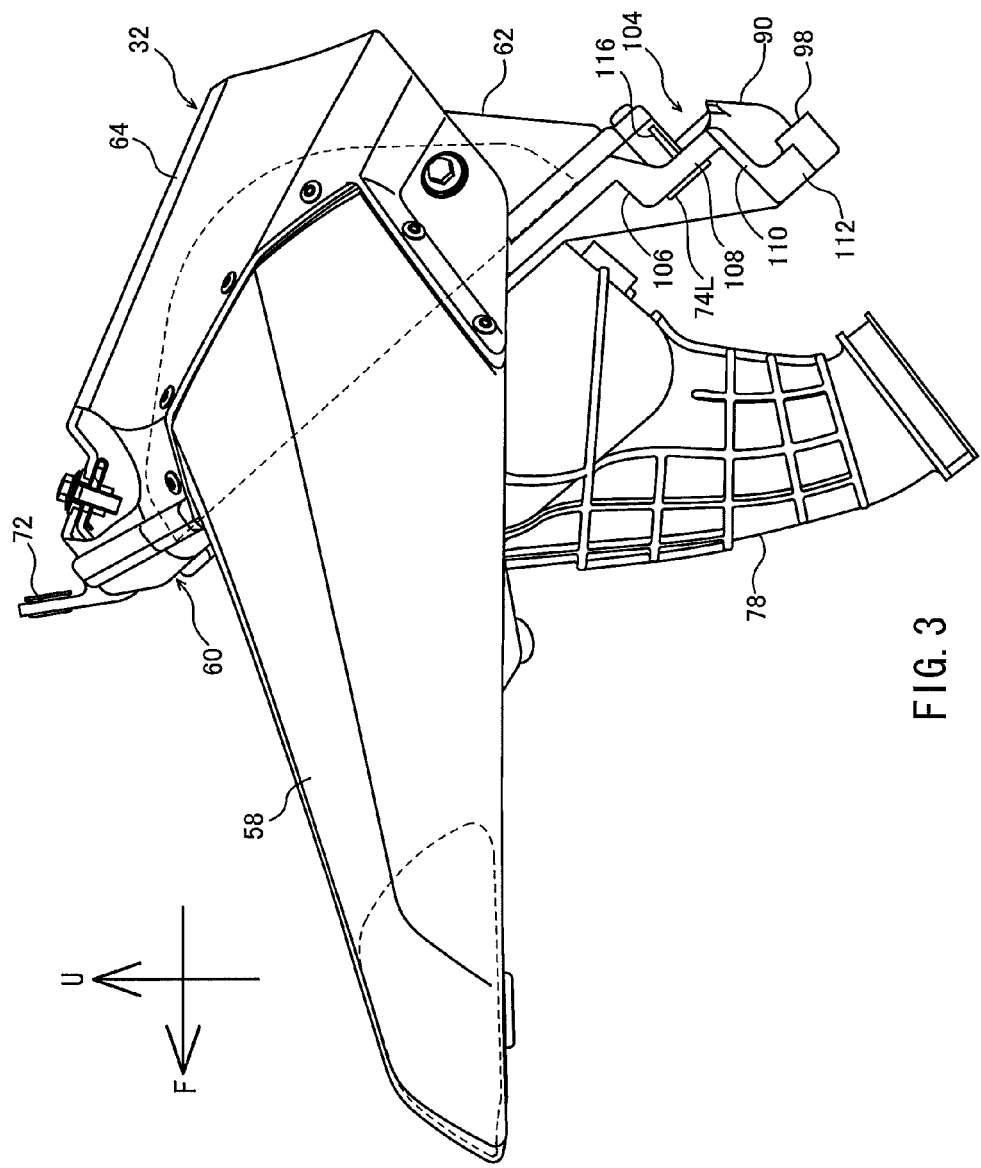
FIG. 3 is a left side view of the air cleaner.
Figure 4:
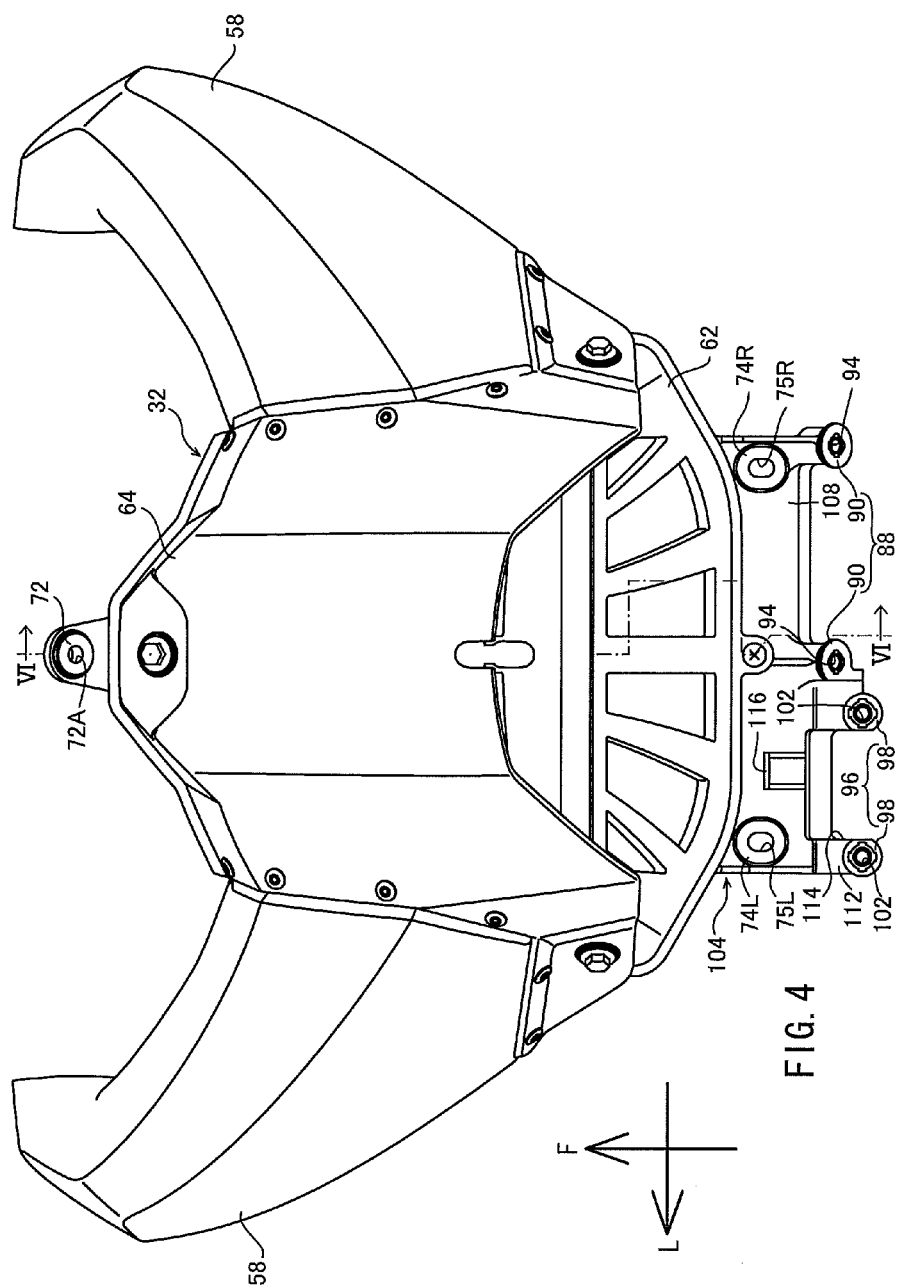
FIG. 4 is a plan view of the air cleaner.
Figure 5:
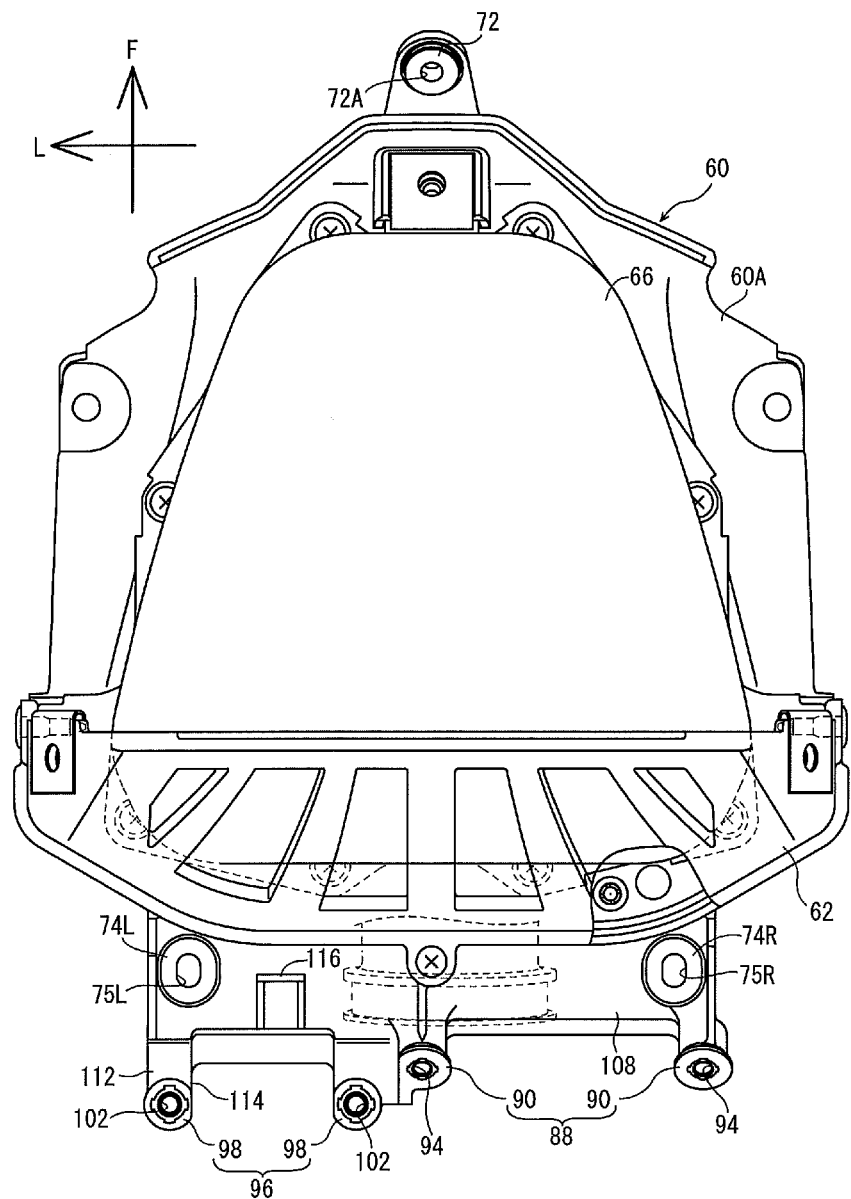
FIG. 5 is a plan view of a base member.

The air cleaner 32 will be described with reference to FIGS. 3 to 6. FIG. 3 is a left side view of the air cleaner 32. FIG. 4 is a plan view of the air cleaner 32. FIG. 5 is a plan view of a base member 60. FIG. 6 is a cross-sectional view taken on line VI-VI of FIG. 4. In FIGS. 3 and 6, arrow F indicates the forward direction with respect to the motorcycle 10, and arrow U the upward direction with respect to the motorcycle 10. In FIGS. 4 and 5, arrow F indicates the forward direction with respect to the motorcycle 10, and arrow L indicates the left direction with respect to motorcycle 10.

As shown in FIG. 6, the air cleaner 32 includes a base member 60, a first cover member 62, a second cover member 64, an air cleaner element 66, and a lead-in duct 78.

The first and second cover members 62 and 64 are attached to the base member 60 so as to define a containing space 76. The air cleaner element 66 is located in the containing space 76.

As shown in FIGS. 3 and 4, the air intake ducts 58 are attached to the second cover member 64.

As shown in FIG. 6, the lead-in duct 78 is located in an opening 80 provided in the body 60A of the base member 60, and is attached to the body 60. The lead-in duct 78 is connected with a throttle body 79 (see FIG. 7A). The throttle body 79 is connected with the engine 22 (see FIGS. 1 and 2). Within the throttle body 79, a fuel injector is located closer to the engine 22 than the throttle valve is.

Figure 7A:
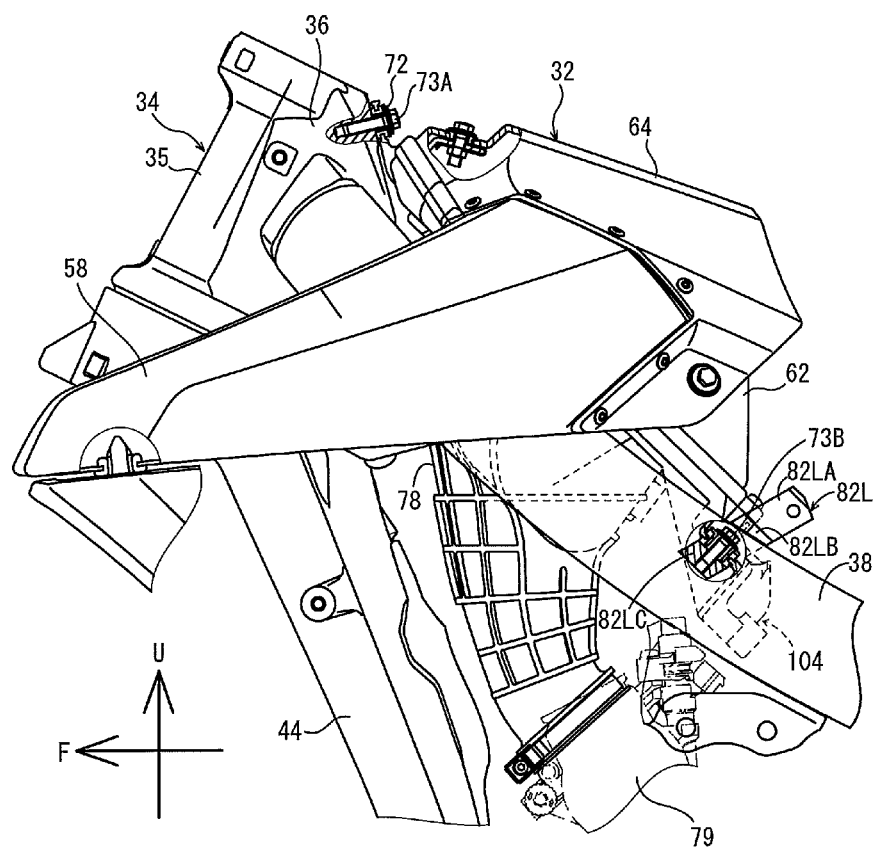
FIG. 7A is left side view of the air cleaner as attached to the body frame.
Figure 9:
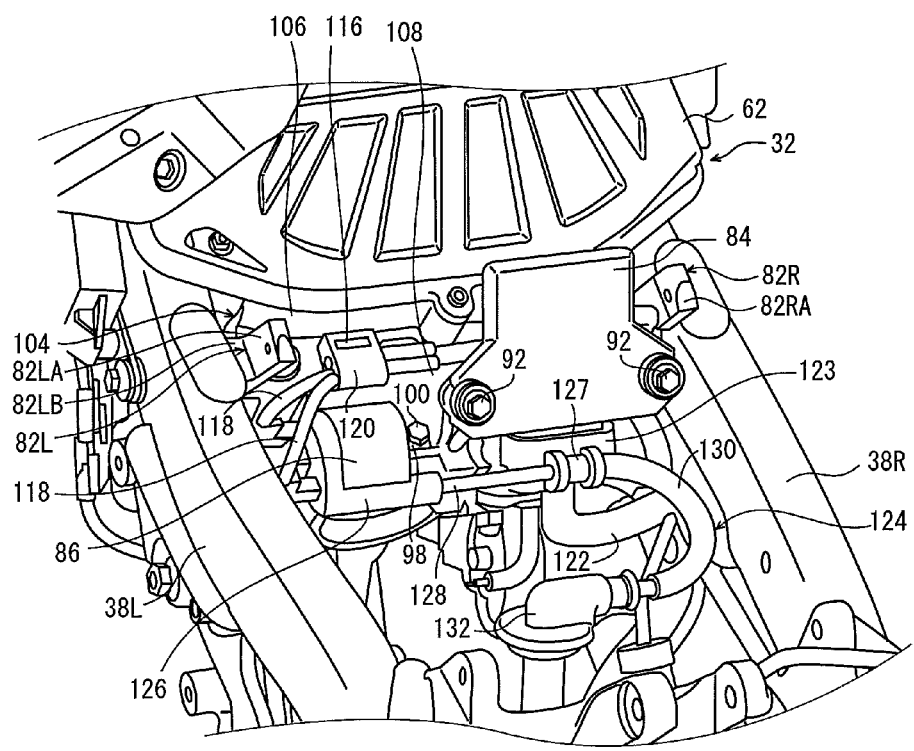
FIG. 9 is a perspective view of the ignition coil and engine control unit attached to the air cleaner.

As shown in FIGS. 7A, 8 and 9, the air cleaner 32 is attached to the body frame 12. An arrangement to attach the air cleaner 32 to the body frame 12 will be described below.

As shown in FIG. 5, the base member 60 includes an attachment portion 72 and a pair of attachment portions 74L and 74R. The attachment portion 72 is located forward of the attachment portions 74L and 74R. The attachment portions 74L and 74R are spaced apart from each other in a vehicle width direction.

As shown in FIG. 5, the attachment portion 72 is located forward of the body 60A. An insertion hole 72A is provided in the attachment portion 72. A bolt 73A to attach the base member 60 to the connecting frame 36 is inserted through the insertion hole 72A (see FIG. 7B).

Figure 2C:
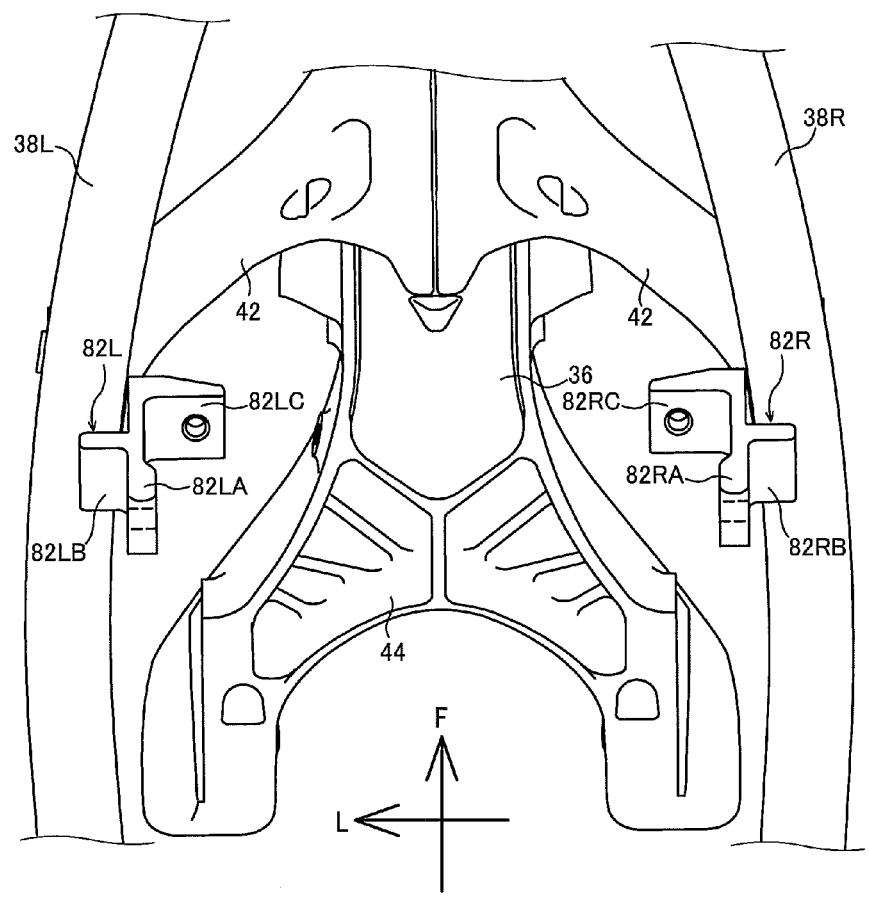
FIG. 2C is a plan view of the attachment pieces attached to the body frame.

As shown in FIG. 5, the attachment portion 74L is located rearward of the body 60A. An insertion hole 75L is provided in the attachment portion 74L. A bolt 73B to attach the base member 60 to an attachment piece 82L (see FIGS. 2B and 2C) is inserted through the insertion hole 75L (see FIGS. 7C and 8). The attachment piece 82L is welded to the left main frame 38L. As shown in FIG. 2C, the attachment piece 82L includes a body 82LA, a weld portion 82LB and an attachment portion 82LC. The body LA extends in a top-to-bottom direction. The weld portion 82LB is connected with the body 82LA and is located to the left of the body 82LA. The attachment piece 82L is welded to the left main frame 38L using the weld portion 82LB. The attachment portion 82LC is connected with the bottom end of the body 82LA and is located to the right of the body 82LA. The base member 60 is attached to the attachment portion 82LC. In other words, the base member 60 is attached to the left main frame 38L via the attachment piece 82L. The fuel tank 30 is attached to the top end of the body 82LA.

As shown in FIG. 5, the attachment portion 74R is located rearward of the body 60A. An insertion hole 75R is provided in the attachment portion 74R. A bolt 73C (see FIG. 8) to attach the base member 60 to an attachment piece 82R (see FIGS. 2B and 2C) is inserted through the insertion hole 75R. The attachment piece 82R is welded to the right main frame 38R. As shown in FIG. 2C, the attachment piece 82R includes a body 82RA, a weld portion 82RB and an attachment portion 82RC. The body RA extends in a top-to-bottom direction. The weld portion 82RB is connected with the body 82RA and is located to the right of the body 82RA. The attachment piece 82R is welded to the right main frame 38R using the weld portion 82RB. The attachment portion 82RC is connected with the bottom end of the body 82RA and is located to the left of the body 82RA. The base member 60 is attached to the attachment portion 82RC. In other words, the base member 60 is attached to the right main frame 38R via the attachment piece 82R. The fuel tank 30 is attached to the top end of the body 82RA.

Figure 7B:
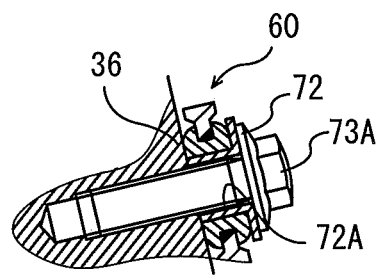
FIG. 7B is an enlarged cross-sectional view of portions of components shown in FIG. 7A, showing an attachment portion as attached to the connecting frame.
Figure 7C:
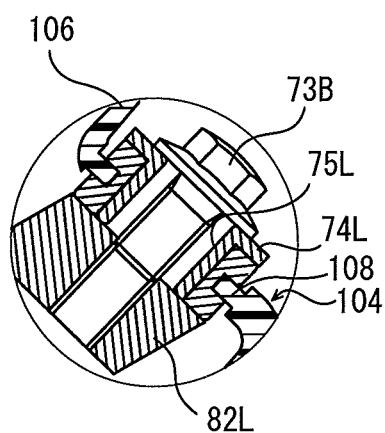
FIG. 7C is an enlarged cross-sectional view of portions of components shown in FIG. 7A, showing an attachment portion as attached to the attachment piece.

As shown in FIG. 7B, the base member 60 is attached to the connecting frame 36 using the attachment portion 72. As shown in FIGS. 7C and 8, the base member 60 is attached to the attachment piece 82L using the attachment portion 74L, and attached to the attachment piece 82R using the attachment portion 74R.

In the present preferred embodiment, the insertion holes 75L and 75R are elongated holes extending in a front-to-rear direction. This facilitates attaching the base member 60 to the main frames 38L and 38R.

Figure 12:
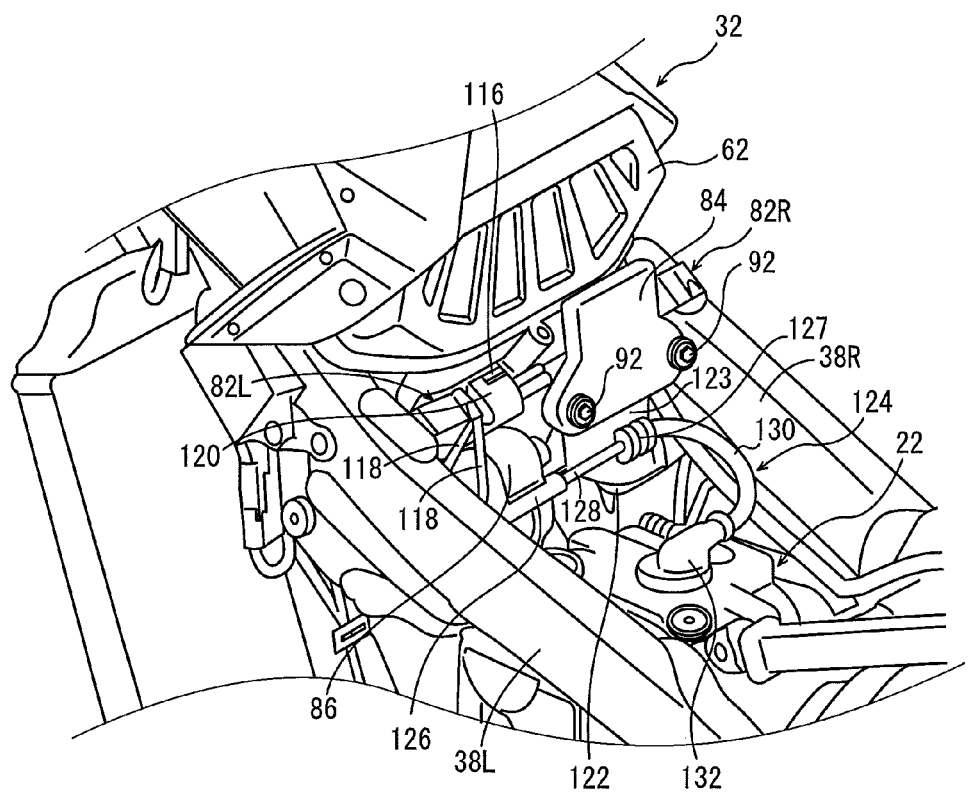
FIG. 12 is a perspective view illustrating the positional relationship between the ignition coil and engine control unit attached to the air cleaner, and the engine.

With the air cleaner 32 thus attached to the body frame 12, the air cleaner 32 is located above the engine 22 (see FIG. 12).

As shown in FIGS. 8 and 9, an engine control unit 84 and ignition coil 86 are attached to the air cleaner 32. The engine control unit 84 controls the operation of the engine 22. The ignition coil 86 supplies the spark plug (not shown) of the engine 22 with a voltage.

As shown in FIGS. 4 and 5, the air cleaner 32 includes a first support 88. The first support 88 includes a pair of support portions 90. Each support portion 90 includes an insertion hole 94 through which a bolt 92 (see FIG. 8) to attach the engine control unit 84 is to be inserted. In other words, the engine control unit 84 is attached using the first support 88 (i.e. the support portions 90). As shown in FIG. 8, the bolts 92 are located closer to the engine 22 than the attachment portions 74L and 74R are. In other words, the first support 88 (i.e. the support portions 90) is located closer to the engine 22 than the attachment portions 74L and 74R are.

As shown in FIGS. 4 and 5, the air cleaner 32 includes a second support 96. The second support 96 includes a pair of support portions 98. Each support portion 98 includes an insertion hole 102 through which a bolt 100 to attach the ignition coil 86 is to be inserted. In other words, the ignition coil 86 is attached using the second support 96 (i.e. the support portions 98). As shown in FIG. 8, the bolts 100 are located closer to the engine 22 than the attachment portions 74L and 74R are. In other words, the second support 96 (i.e. the support portions 98) is located closer to the engine 22 than the attachment portions 74L and 74R are.

Figure 10:
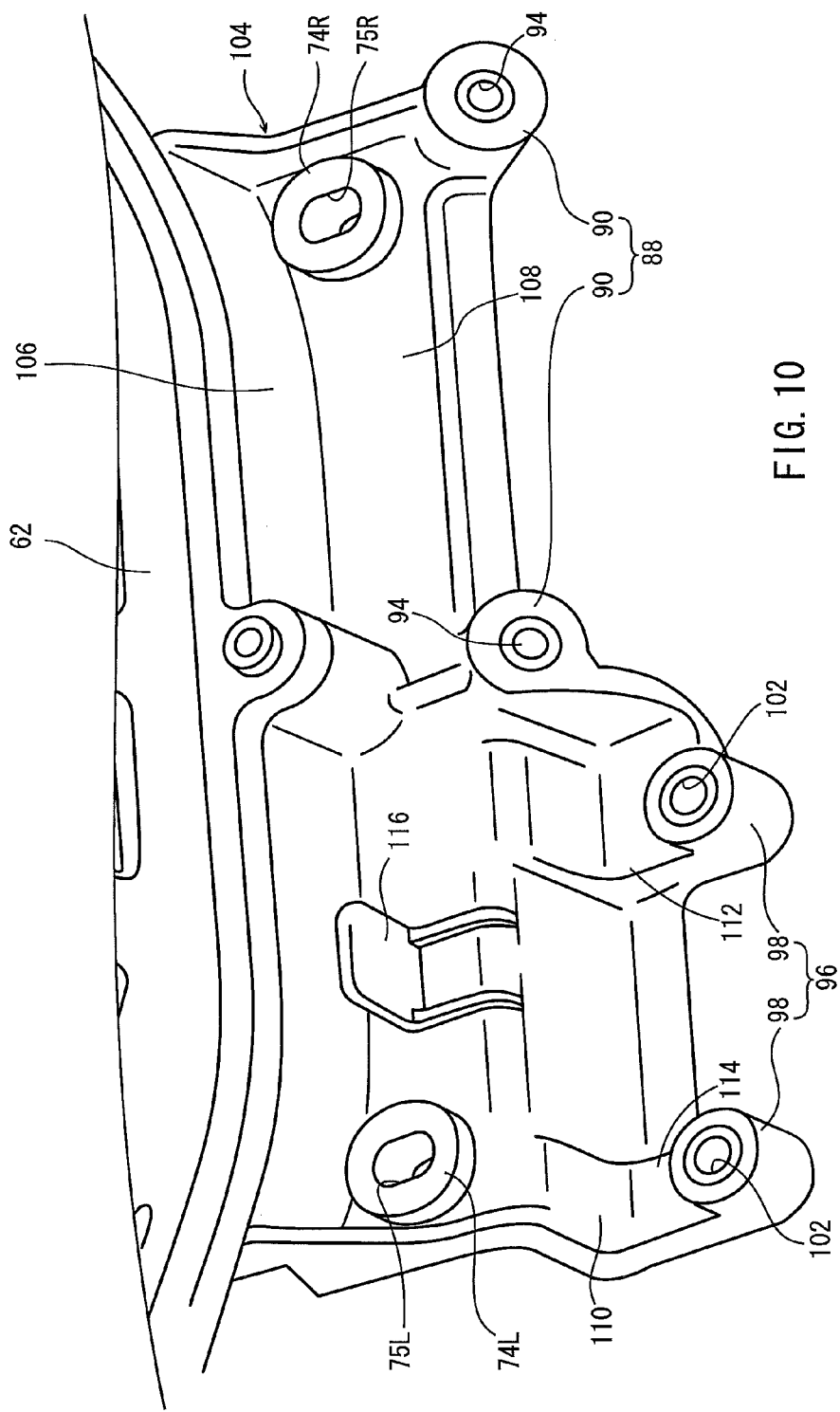
FIG. 10 is a perspective view of the extending member provided on the base member.

As shown in FIGS. 4, 5 and 10, the air cleaner 32 includes an extending member 104. The extending member 104 is provided on the base member 60. The extending member 104 is located at the rear end of the base member 60. With the base member 60 attached to the body frame 12, the extending member 104 is located between the main frames 38, as shown in FIGS. 8 and 9.

Figure 11:
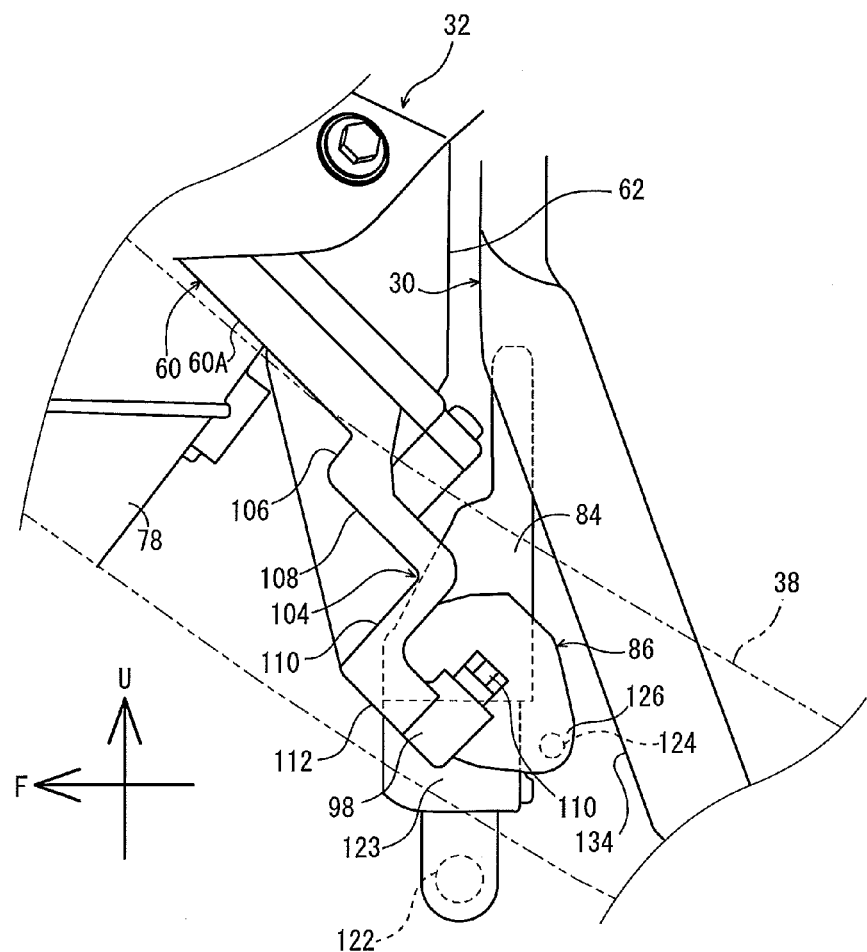
FIG. 11 is a left side view illustrating the relationship between the ignition coil and engine control unit and the main frame.

As shown in FIGS. 10 and 11, the extending member 104 includes a first extending portion 106, a second extending portion 108, a third extending portion 110 and a fourth extending portion 112. The first extending portion 106 extends forward and downward from the rear end of the body 60A. The rear end of the body 60A is joined to the rear end of the first cover member 62. The second extending portion 108 is connected with the bottom edge of the first extending portion 106 and extends rearward and downward from the bottom edge of the first extending portion 106. The third extending portion 110 is connected with the bottom edge of the second extending portion 108 and extends forward and downward from the bottom edge of the second extending portion 108. The fourth extending portion 112 is connected with the bottom edge of the third extending portion 110 and extends downward and rearward from the bottom edge of the third extending portion 110.

As shown in FIG. 10, the first support 88 (i.e. the support portions 90) is located on the bottom edge of the second extending portion 108. The support portions 90 protrude rearward and upward from the bottom edge of the second extending portion 108. In other words, the support portions 90 protrude in a direction that is angled relative to the direction in which the second extending portion 108 extends.

As shown in FIG. 10, the third extending portion 110 is not arranged along the entire dimension of the extending member 104 as measured in a vehicle width direction. The third extending portion 110 is located closer to one of the ends of the extending member disposed in a vehicle width direction than the first support 88 is (i.e. to the left in the present preferred embodiment). Similarly, the fourth extending portion 112 is not arranged along the entire dimension of the extending member 104 as measured in a vehicle width direction. The fourth extending portion 112 is located closer to one of the ends of the extending member disposed in a vehicle width direction than the first support 88 is (i.e. to the left in the present preferred embodiment).

As shown in FIG. 10, the second support 96 (i.e. the support portions 98) is located on the bottom edge of the fourth extending portion 112. The support portions 98 are located lower than the bottom edge of the fourth extending portion 112. The insertion holes 102 in the support portions 98 extend in a direction parallel or substantially parallel to the direction in which the third extending portion 110 extends. The insertion holes 102 extend in a direction that is angled relative to the direction in which the insertion holes 94 in the support portions 90 extend.

As shown in FIG. 10, the second support 96 (i.e. the support portions 98) is located lower than the first support 88 (i.e. the support portions 90). A continuous recess 114 is provided in the third extending portion 110 and the fourth extending portion 112. As shown in FIG. 9, the ignition coil 86 is located in the recess 114.

As shown in FIGS. 4, 5 and 10, the second support 96 (i.e. the support portions 98) is located rearward of the first support 88 (i.e. the support portions 90).

As shown in FIGS. 4, 5 and 10, the attachment portions 74L and 74R are located on the second extending portion 108. The attachment portion 74L is located adjacent one of the ends of the second extending portion 108 disposed in a vehicle width direction (i.e. the left end in the present preferred embodiment). The attachment portion 74R is located adjacent the other one of the ends of the second extending portion 108 disposed in a vehicle width direction (i.e. the right end in the present preferred embodiment).

In the present preferred embodiment, as shown in FIGS. 4, 5 and 10, a latch piece 116 is provided on the second extending portion 108. As shown in FIG. 9, a binding member 120 to bind together cords 118 connected with the ignition coil 86 is latched to the latch piece 116.

As shown in FIGS. 8 and 9, the engine control unit 84 is attached to the first support 88 (i.e. the support portions 90) by the bolts 92. In this state, the engine control unit 84 extends in a height direction (see FIG. 9).

As shown in FIGS. 8 and 9, the ignition coil 86 is attached to the second support 96 (i.e. the support portions 98) by the bolts 100. In this state, the central axis of the ignition coil 86 extends in a vehicle width direction. As shown in FIG. 9, the ignition coil 86 is located lower than the engine control unit 84.

As shown in FIG. 8, the engine control unit 84 and ignition coil 86 are located between the main frames 38 as viewed in a plan view of the vehicle. The engine control unit 84 and ignition coil 86 are arranged in a vehicle width direction as viewed in a plan view of the vehicle.

As shown in FIG. 11, a portion of the ignition coil 86 overlaps the engine control unit 84 as viewed in a side view of the vehicle. The engine control unit 84 and ignition coil 86 overlap the main frames 38 as viewed in a side view of the vehicle.

As shown in FIG. 12, the engine control unit 84 and ignition coil 86 are located above the engine 22.

As shown in FIGS. 8 and 9, wiring 122 is connected with the engine control unit 84. The wiring 122 extends downward from the engine control unit 84. A connector 123 is located at the end of the wiring 122 that is associated with the engine control unit 84. The wiring 122 includes a harness to be connected with the meters. As such, it is preferable that the engine control unit 84 is located forward of the center of gravity of the engine 22.

As shown in FIGS. 8, 9 and 10, a connecting cord 124 is connected with the ignition coil 86. The connecting cord 124 connects the ignition coil 86 with the spark plug (not shown).

As shown in FIGS. 8, 9 and 10, the ignition coil 86 includes a cord support 126. As shown in FIG. 8, the cord support 126 is located rearward of the engine control unit 84 as viewed in a plan view of the vehicle. The connecting cord 124 extends from the cord support 126 toward the one of the sides of the vehicle disposed in a vehicle width direction that is adjacent the engine control unit 84, and passes behind the wiring 122 (i.e. behind the connector 123 in the present preferred embodiment). In other words, the connecting cord 124 is arranged to be non-parallel to the wiring 122. The middle portion of the connecting cord 124 as measured in a length direction is supported by a support piece 127 provided on the connector 123.

As shown in FIGS. 8, 9 and 10, the connecting cord 124 includes an extending portion 128, a curved portion 130 and a plug cap 132. The extending portion 128 is connected with the ignition coil 86 (or more particularly, the cord support 126), and extends from the ignition coil 86 toward the one of the sides of the vehicle disposed in a vehicle width direction that is adjacent the engine control unit 84. As shown in FIG. 8, the curved portion 130 is connected with the extending portion 128 and is curved as viewed in a plan view of the vehicle. The plug cap 132 is connected with the curved portion 130 and is attached to the spark plug (not shown).

Figure 13:
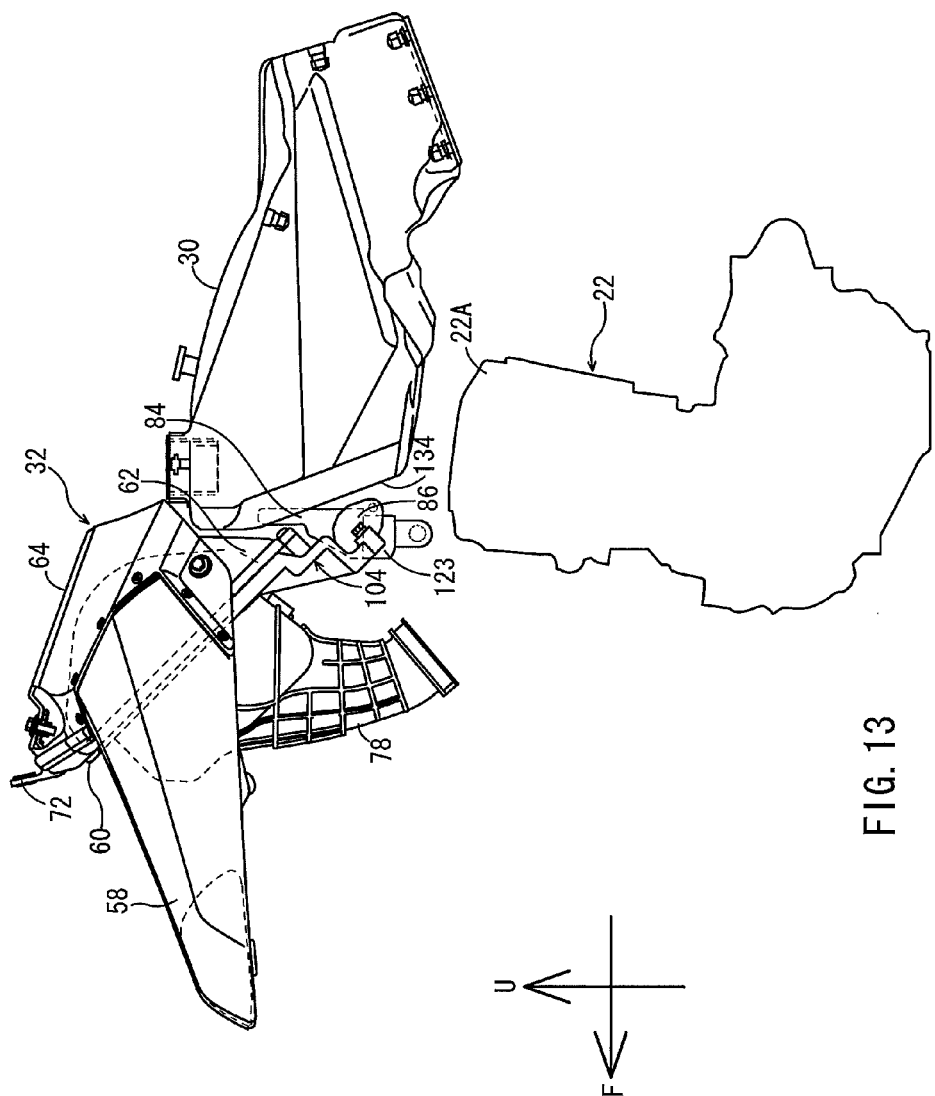
FIG. 13 is a left side view illustrating the positional relationship between the air cleaner, fuel tank and engine.

As shown in FIG. 13, the fuel tank 30 is located rearward of the air cleaner 32. The lowermost point of the fuel tank 30 is located lower than the lowermost point of the air cleaner 32. The engine control unit 84 and ignition coil 86 are located between the air cleaner 32 and fuel tank 30. A rear portion of the air cleaner 32 (i.e. the extending member 104) is located above the engine 22 (or more particularly, the cylinder 22A in the present preferred embodiment). A front portion of the fuel tank 30 is located above the engine 22 (or more particularly, the cylinder 22A in the present preferred embodiment). The engine control unit 84 and ignition coil 86 are located above the engine 22. The engine control unit 84 and ignition coil 86 are located upward of the lowermost point of the fuel tank 30.

As viewed in a side view of the vehicle, a portion of the engine control unit 84 overlaps the fuel tank 30. This allows the fuel tank 30 to be positioned close to the engine control unit 84 and ignition coil 86. This allows the mass of the vehicle to be concentrated as measured in a front-to-rear direction of the vehicle.

A slope 134 extending rearward and downward is provided on the front end of the fuel tank 30. This allows the engine control unit 84 and ignition coil 86 to be positioned close to the fuel tank 30. This allows the mass of the vehicle to be concentrated as measured in a front-to-rear direction of the vehicle.

A motorcycle 10 includes a head pipe 34, a pair of main frames 38, an engine 22, an air cleaner 32, a fuel tank 30, an engine control unit 84, and an ignition coil 86. The pair of main frames 38 extend rearward from the head pipe 34. The engine 22 is supported by the pair of main frames 38. The air cleaner 32 is located rearward of the head pipe 34. The fuel tank 30 is located rearward of the air cleaner 32. The engine control unit 84 controls the operation of the engine 22. The ignition coil 86 supplies a voltage to a spark plug included in the engine 22. A rear portion of the air cleaner 32 is located above the engine 22. A front portion of the fuel tank 30 is located above the engine 22. The engine control unit 84 and the ignition coil 86 are located above the engine 22 and located between the air cleaner 32 and the fuel tank 30. The ignition coil 86 overlaps the engine control unit 84 as viewed in a side view of the vehicle.

A rear portion of the air cleaner 32 is located above the engine 22. Further, a front portion of the fuel tank 30 is located above the engine 22. In addition, the engine control unit 84 and ignition coil 86 are located above the engine 22 and located between the air cleaner 32 and fuel tank 30. This reduces the wiring 122 and 124 that connects the engine control unit 84 and ignition coil 86 with the engine 22 and, at the same time, concentrates the mass of the vehicle.

Since the engine control unit 84 and ignition coil 86 are located between the air cleaner 32 and fuel tank 30, the engine control unit 84 and ignition coil 86 may be positioned distant from the engine 22 even if the air cleaner 32 and fuel tank 30 are located near the engine 22. As such, the mass of the vehicle is concentrated as measured in a top-to-bottom direction with respect to the vehicle.

The ignition coil 86 overlaps the engine control unit 84 as viewed in a side view of the vehicle. The engine control unit 84 and ignition coil 86 are arranged to effectively use the space extending in a vehicle width direction. This allows the mass of the vehicle to be concentrated as measured in a front-to-rear direction with respect to the vehicle. Further, arranging the engine control unit 84 and ignition coil 86 so as to overlap each other as viewed in a side view of the vehicle allows the fuel tank 30 to be positioned near the air cleaner 32. As such, the mass of the vehicle is concentrated as measured in a front-to-rear direction with respect to the vehicle.

In the motorcycle 10, the engine control unit 84 and the ignition coil 86 overlap the pair of main frames 38 as viewed in a side view of the vehicle. Thus, the pair of main frames 38 protect the engine control unit 84 and ignition coil 86.

In the motorcycle 10, the air cleaner 32 includes a base member 60. The base member 60 is attached to the pair of main frames 38. The base member 60 includes attachment portions 74L and 74R, a first support 88, and a second support 96. The attachment portions 74L and 74R each include an insertion hole 75L or 75R through which a bolt 73B or 73C to attach the base member 60 to the pair of main frames 38 is to be inserted. The first support 88 is located closer to the engine 22 than the attachment portions 74L and 74R are, and the engine control unit 84 is attached thereto. A second support 96 is located closer to the engine 22 than the attachment portions 74L and 74R are, and the ignition coil 86 is attached thereto.

Thus, intake air pulsations in the air cleaner 32 are less likely to be transmitted to the engine control unit 84 and ignition coil 86.

The motorcycle 10 further includes a connecting cord 124 and wiring 122. The connecting cord 124 connects the ignition coil 86 with the spark plug. The wiring 122 extends from the engine control unit 84. The wiring 122 is arranged to be non-parallel to the connecting cord 124.

Thus, electric signals flowing through the wiring 122 are less likely to receive noise.

In the motorcycle 10, the wiring 122 extends downward from the engine control unit 84. The ignition coil 86 includes a cord support 126. The cord support 126 is located rearward of the engine control unit 84 as viewed in a plan view of the vehicle. The connecting cord 124 extends from the cord support 126 toward the one of the sides of the vehicle disposed in a vehicle width direction that is adjacent the engine control unit 84, and passes behind the wiring 122.

Thus, the connecting cord 124 preferably is positioned close to the fuel tank 30. As such, the mass of the vehicle is concentrated.

In the motorcycle 10, the ignition coil 86 and engine control unit 84 are arranged in a vehicle width direction as viewed in a plan view of the vehicle. The connecting cord 124 includes an extending portion 128, a curved portion 130 and a plug cap 132. The extending portion 128 is connected with the ignition coil 86 and extends from the ignition coil 86 toward the one of the sides of the vehicle disposed in a vehicle width direction that is adjacent the engine control unit 84. The curved portion 130 is connected with the extending portion 128 and curves as viewed in a plan view of the vehicle. The plug cap 132 is connected with the curved portion 130 and attached to the spark plug.

Thus, a certain length of the connecting cord 124 is ensured. As such, the plug cap 132 is easily detached and attached.

In the motorcycle 10, the lowermost point of the fuel tank 30 is located lower than the lowermost point of the air cleaner 32. Thus, the fuel tank 30 preferably is positioned lower. This allows the mass of the vehicle to be concentrated as measured in a height direction with respect to the vehicle.

In the motorcycle 10, the engine 22 includes a cylinder 22A. The foremost point of the fuel tank 30 is located forward of the rearmost point of the cylinder 22A.

Thus, the fuel tank 30 is preferably positioned more forward. This allows the mass of the vehicle to be concentrated as measured in a front-to-rear direction with respect to the vehicle.

In the motorcycle 10, the engine control unit 84 and the ignition coil 86 are located higher than the lowermost point of the fuel tank 30.

Thus, the mass of the vehicle preferably is concentrated as measured in a top-to-bottom direction with respect to the vehicle.

While the preferred embodiments described above relate to a motocrosser-type motorcycle, for example, the present invention is not limited to such a configuration. For example, the vehicle may be a motorcycle other than motocrosser-type motorcycles, or may be three- or four-wheeled leaning vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
   a head pipe;
   a pair of main frames extending rearward from the head pipe;
   an engine supported by the pair of main frames;

an air cleaner located rearward of the head pipe;
a fuel tank located rearward of the air cleaner;
an engine control unit configured and programmed to control an operation of the engine; and
an ignition coil configured to supply a voltage to a spark plug included in the engine; wherein
a rear portion of the air cleaner is located above the engine;
a front portion of the fuel tank is located above the engine;
the engine control unit and the ignition coil are located above the engine and located between the air cleaner and the fuel tank; and
the ignition coil overlaps the engine control unit as viewed in a side view of the vehicle.

2. The straddle-type vehicle according to claim 1, wherein the engine control unit and the ignition coil overlap the pair of main frames as viewed in a side view of the vehicle.

3. The straddle-type vehicle according to claim 1, wherein the air cleaner includes a base member attached to the pair of main frames; and
the base member includes:
  attachment portions each including an insertion hole through which a bolt to attach the base member to the pair of main frames is to be inserted;
  a first support located closer to the engine than the attachment portions are, the engine control unit being attached to the first support; and
  a second support located closer to the engine than the attachment portions are, the ignition coil being attached to the second support.

4. The straddle-type vehicle according to claim 1, further comprising:
a connecting cord configured to connect the ignition coil with the spark plug; and
wiring extending from the engine control unit; wherein
the wiring is arranged to be non-parallel to the connecting cord.

5. The straddle-type vehicle according to claim 4, wherein
the wiring extends downward from the engine control unit;
the ignition coil includes a cord support located rearward of the engine control unit as viewed in a plan view of the vehicle; and
the connecting cord extends from the cord support toward one side of the vehicle disposed in a vehicle width direction that is adjacent to the engine control unit, and passes behind the wiring.

6. The straddle-type vehicle according to claim 4, wherein the connecting cord includes:
  an extending portion connected with the ignition coil and extending from the ignition coil toward one side of the vehicle disposed in a vehicle width direction that is adjacent to the engine control unit;
  a curved portion connected with the extending portion and curves as viewed in a plan view of the vehicle; and
  a plug cap connected with the curved portion and attached to the spark plug.

7. The straddle-type vehicle according to claim 1, wherein a lowermost point of the fuel tank is located lower than a lowermost point of the air cleaner.

8. The straddle-type vehicle according to claim 1, wherein the engine includes a cylinder; and
a foremost point of the fuel tank is located forward of a rearmost point of the cylinder.

9. The straddle-type vehicle according to claim 1, wherein the engine control unit and the ignition coil are located higher than a lowermost point of the fuel tank.

* * * * *